(12) United States Patent
Yin

(10) Patent No.: US 9,009,463 B2
(45) Date of Patent: Apr. 14, 2015

(54) SECURE DELIVERY OF TRUST CREDENTIALS

(75) Inventor: Fenglin Yin, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 303 days.

(21) Appl. No.: 13/544,252

(22) Filed: Jul. 9, 2012

(65) Prior Publication Data
US 2014/0013109 A1    Jan. 9, 2014

(51) Int. Cl.
*H04L 29/06*    (2006.01)

(52) U.S. Cl.
CPC .................. *H04L 63/0823* (2013.01)

(58) Field of Classification Search
None
See application file for complete search history.

(56) References Cited

U.S. PATENT DOCUMENTS

| 5,721,781 | A * | 2/1998 | Deo et al. ................. 705/67 |
| 7,680,743 | B2 * | 3/2010 | Peinado et al. ............. 705/59 |
| 2004/0039911 | A1 * | 2/2004 | Oka et al. ................ 713/175 |

* cited by examiner

*Primary Examiner* — Benjamin Lanier

(57) ABSTRACT

A system is configured to receive, by one or more servers, a request for a certificate from a user device. The request may include a first parameter, a second parameter, and a third parameter. The system is further configured to identify a key based on the first parameter, generate a fourth parameter based on the key and the third parameter, authenticate the user device based on the fourth parameter and the second parameter, generate the certificate based on authenticating the user device, store information associated with the certificate, and send the certificate to the user device. The user device may use the certificate to establish a session to interact with an application server.

20 Claims, 11 Drawing Sheets

| DC ID | SVN | Current SVN | Key | Device ID | |
|---|---|---|---|---|---|
| | | | | IMEI | ICCID |
| 3456 | 1.5.1 | 1.5.1 | 3caaa3e8a99f9deb50f3af57adf622aa | 4587412365189541 | 8991101200003243421 |
| 7890 | 1.5.1 | 1.5.1 | 14f9701ae35fe28c440adf4d4ea9c026 | 5412657895123105 | 8961101200003243423 |
| 1235 | 1.4.2 | 1.5.1 | fa636a2825b339c940668a3157244d17 | 5487920035487892 | 9091101200340324342 7 |

Fig. 7

SECURE DELIVERY OF TRUST CREDENTIALS

BACKGROUND

Users sometimes use user devices to perform various tasks, such as accessing content (video, images, audio, and/or some other content), sending electronic messages ("e-mails"), accessing the World Wide Web, and/or some performing some other task via the user devices. User device applications, used to perform tasks, sometimes communicate with an application server in order to receive information used to perform a desired task. The application server may authenticate trusted user devices to allow the trusted user devices to receive information while preventing unauthorized or untrusted devices from accessing the application server.

BRIEF DESCRIPTION OF THE DRAWINGS

FIG. 7 illustrates an example data structure that may be stored by one or more servers, such as a registration server;

DETAILED DESCRIPTION OF THE PREFERRED EMBODIMENTS

The following detailed description refers to the accompanying drawings. The same reference numbers in different drawings may identify the same or similar elements.

A system and/or method, as described herein, may provide secure delivery of trust credentials from a registration server to a user device. In some implementations, an application server (referred to as an "app server") may establish a secure session with the user device based on receiving the trust credentials from the user device. The app server may establish a secure session with the user device to allow the user device to receive information associated with performing a task, such as accessing content (video, images, audio, and/or some other content), sending and/or receiving e-mails, playing an online game, and/or performing some other task via the user device. Additionally, the user device may provide the trust credentials to communicate with the app server in lieu of providing some other credentials, such as a username and/or a password, thereby improving the user experience associated with performing tasks via the user device.

In some implementations, the trust credentials may be delivered to the user device based on multiple layers of authentication of the user device. Additionally, or alternatively, trust credentials may be delivered to the user device based on a registration server receiving a digital certificate from the user device (e.g., to identify that the user device is a trusted device based on the digital certificate).

Figure 1:
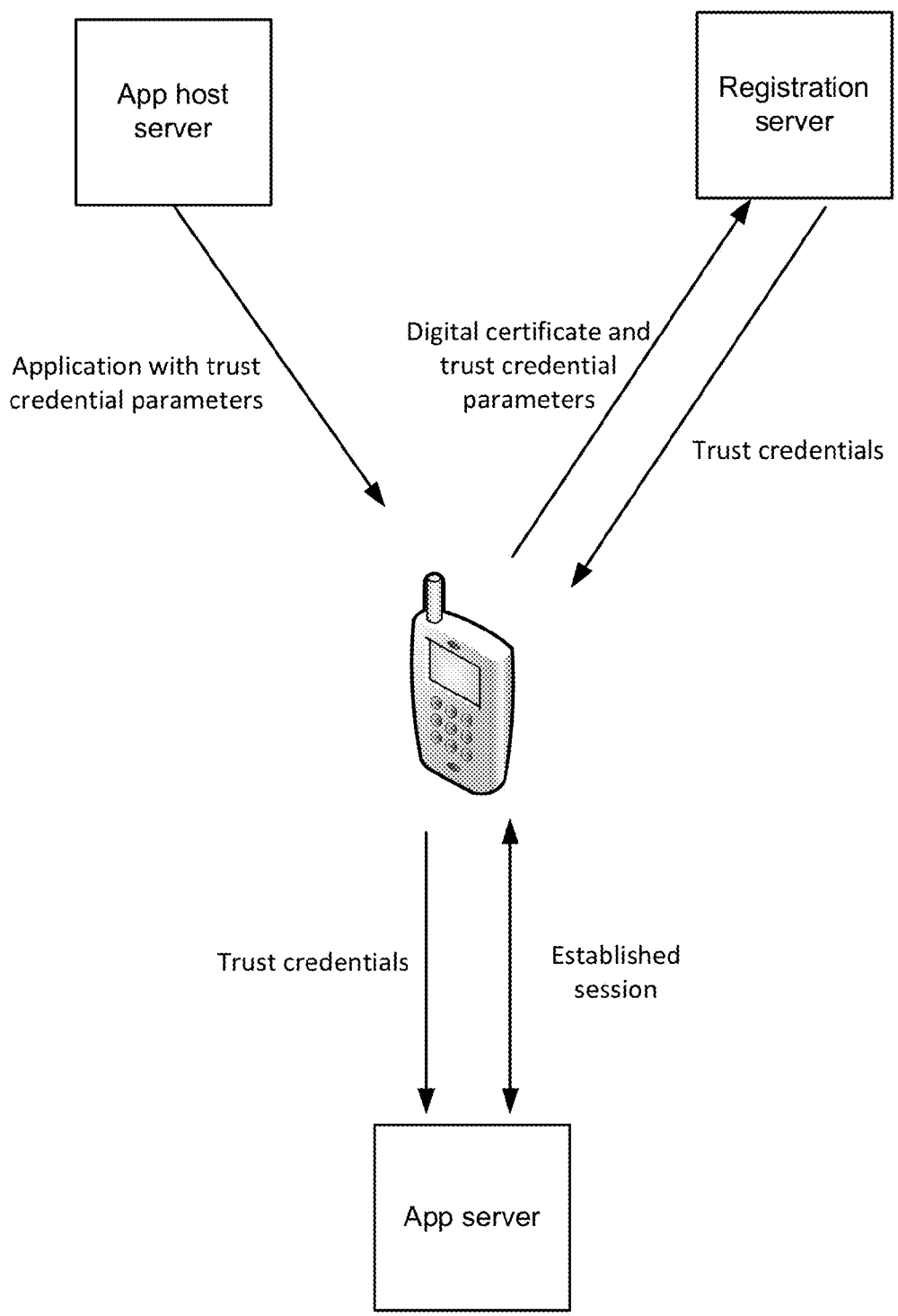
FIG. 1 illustrates an example overview of an implementation described herein.

FIG. 1 illustrates an example overview of an implementation described herein. In FIG. 1, assume that an application host server (referred to as an "app host server") stores an application (e.g., an application to perform a task, such as providing content, sending and/or receiving e-mail, etc.) executable by a user device. Further assume that the app host server stores the application, based on the application being verified (e.g., verified as originating from a trusted source). Further assume that the application includes trust credential parameters (e.g., an application ID, a key (a public or private 128-bit AES key, or some other key), and/or some other parameters)) embedded within the application (e.g., embedded in a security module associated with the application). Additionally, assume that a registration server stores the trust credential parameters associated with the verified application (e.g., based on the application being registered with the registration server). In some implementations, a user device may receive the application including the trust credential parameters from the app host server. For example, a user, associated with the user device, may instruct the user device to download the application from the app host server.

As further shown in FIG. 1, the user device may send the trust credential parameters and/or a digital certificate to the registration server (e.g., based on the user device opening the application received from the app host server). In some implementations, the digital certificate may include information to allow the registration server to identify that the user device is a trusted entity and may also include a security version number (SVN) to identify whether the digital certificate is up to date. The registration server may authenticate the user device, the digital certificate, and/or the trust credential parameters (e.g., based on the trust credential parameters stored by the registration server), and may send trust credentials to the user device, based on authenticating the user device, the digital certificate, and/or the trust credential parameters. In some implementations, the user device may receive the trust credentials and send the trust credentials to the app server (e.g., as an input for a session request with the app server to perform tasks, such as accessing content, sending and/or receiving e-mail, etc.) The app server may authenticate the trust credentials, and may establish a secure session with the user device, based on authenticating the trust credentials.

As described above, the registration server may store trust credential parameters associated with an application that has been verified as originating from a trusted source (e.g., using a testing and/or verification process). As further described above, the registration server may receive trust credential parameters, associated with an application, from a user device. Additionally, the registration server may authenticate the received trust credential parameters based on trust credential parameters stored by the registration server (e.g., trust credential parameters for the verified application). As a result, the registration server may not authenticate trust credential parameters associated with an unverified application, thereby ensuring that the user device may receive trust credentials when executing a verified application but may not receive the trust credentials when executing an unverified application.

Figure 2:
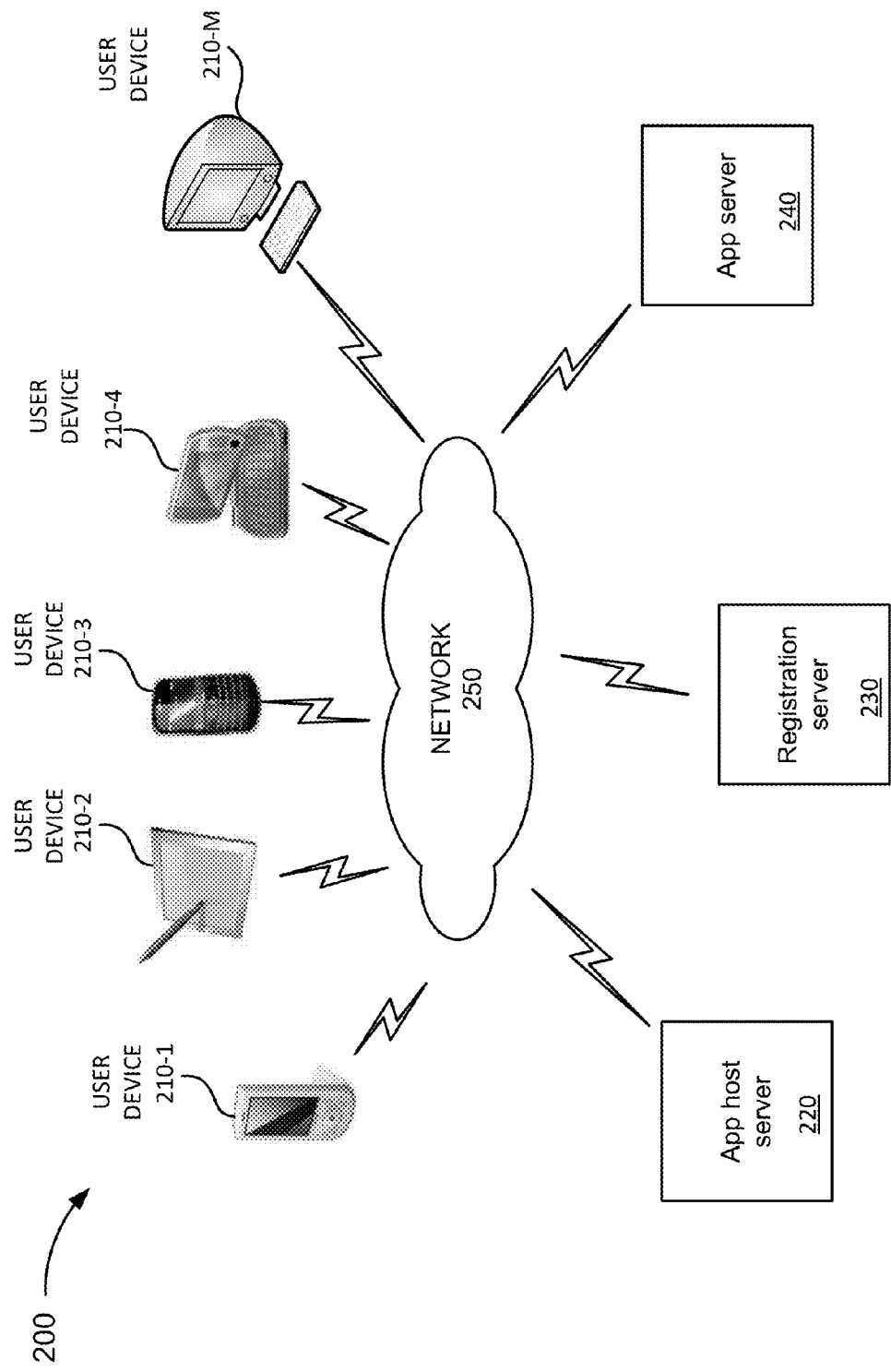
FIG. 2 illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include user devices 210-1, 210-2, ..., 210-M (where M>1) (collectively referred to as "user devices 210," and individually as "user device 210"), app host server 220, registration server 230, app server 240, and/or network 250. While FIG. 2 shows a particular quantity and arrangement of devices, in practice, environment 200 may include additional devices, fewer devices, different devices, or differently arranged devices than are shown in FIG. 2. For example, each of servers 220-240 may be implemented as multiple, possibly distributed, devices. Alternatively, two or more of servers 220-240 may be implemented within a single device. Further, a function described as being performed by one server may be performed by another server or a user device.

User device 210 may include any portable or non-portable device capable of communicating via a network, such as network 250. For example, user device 210 may correspond to a mobile communication device (e.g., a smart phone or a personal digital assistant (PDA)), a portable computer device (e.g., a laptop or a tablet computer), a non-portable computer device (e.g., a personal computer), a gaming device, a set-top box, or another type of device. In some implementations, user device 210 may receive applications stored by app host server 220, and/or from some other server. User device 210 may additionally receive trust credentials from registration server 230 and may access app server 240 using the trust credentials to perform tasks (e.g., access content, send and/or receive e-mail, etc.). Additionally, or alternatively, user device 210 may be used to build and/or develop an application (e.g., an application to perform a task, such as accessing content, sending and/or receiving e-mail, etc.).

App host server 220 may include a computing device, such as a server device or a collection of server devices. In some implementations, app host server 220 may store authenticated and trusted applications received from multiple parties. Additionally, app host server 220 may send applications to user devices 210 over network 250 (e.g., via a user interface (UI) of user device 210 and/or some other technique). App host server 220 may also include authentication information to authenticate user device 210 to receive applications stored by app host server 220. For example, app host server 220 may store user profile information (e.g., usernames and/or passwords associated with users of user devices 210), billing information, application entitlement rights information and/or some other information to allow user device 210 to receive applications stored by app host server 220.

Registration server 230 may include a computing device, such as a server device or a collection of server devices. In some implementations, registration server 230 may store information for an application (e.g., an application for user device 210) which may cause user device 210 to access app server 240 to perform tasks via user device 210 (e.g., access content, send and/or receive e-mail, etc.). In some implementations, registration server 230 may store information for an application, such as an application identifier (ID), an application name, a key (e.g., a public or private 128-bit AES key, or some other key), and/or some other information. In some implementations, registration server 230 may provide a digital certificate to user device 210. Additionally or alternatively, registration server 230 may provide trust credentials to user device 210, based on receiving a digital certificate from user device 210.

App server 240 may include a computing device, such as a server device, or a collection of server devices. In some implementations, app server 240 may establish a session (e.g., a secure session) with user device 210, based on authenticating user device 210 (e.g., by authenticating trust credentials received from user device 210 or some other technique). App server 240 may provide applications and/or services for user device 210, such as services to allow user device 210 to perform tasks (e.g., access content, send and/or receive e-mail, etc.). For example, in the context of providing services to allow user device 210 to access content, app server 240 may authenticate user device 210 to access content (e.g., based on trust credentials and/or login credentials), provide video content metadata, such as lists or categories of video content, and process orders, associated with accessing content (e.g., purchases and/or rentals of video content, or some other content).

In one implementation, the interactions between or with servers 220-240 may be performed using the hypertext transfer protocol (HTTP) or the secure HTTP (HTTPS). In one implementation, the interactions between or with servers 220-240 may be performed using another type of protocol.

Figure 3:
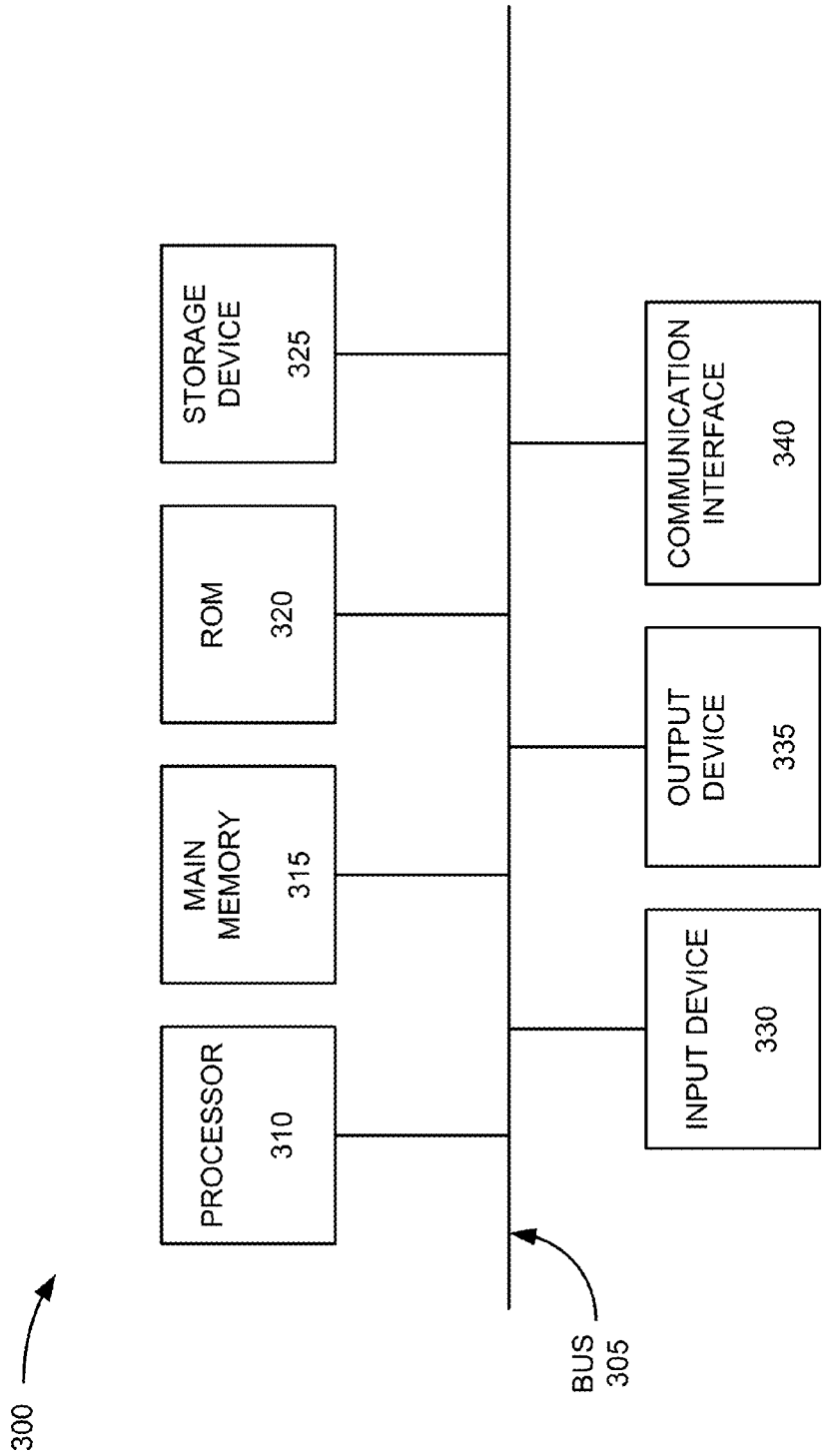
FIG. 3 illustrates example components of a device that may be used within the environment of FIG. 2.

Network 250 may include any type of network or a combination of networks. For example, network 250 may include a local area network (LAN), a wireless LAN (WLAN), a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), a fiber optic (e.g., FiOS), or a combination of networks. Each of user device 210, app host server 220, registration server 230, and/or app server 240 may connect to network 250 via a wireless connection, a wired connection, or a combination thereof FIG. 3 illustrates example components of a device 300 that may be used within environment 200 of FIG. 2. Device 300 may correspond to user device 210 and/or servers 220-240. Each of user device 210 and/or servers 220-240 may include one or more devices 300, and/or one or more components of device 300.

As shown in FIG. 3, device 300 may include a bus 305, a processor 310, a main memory 315, a read only memory (ROM) 320, a storage device 325 (also referred to as a local storage device or local storage), an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
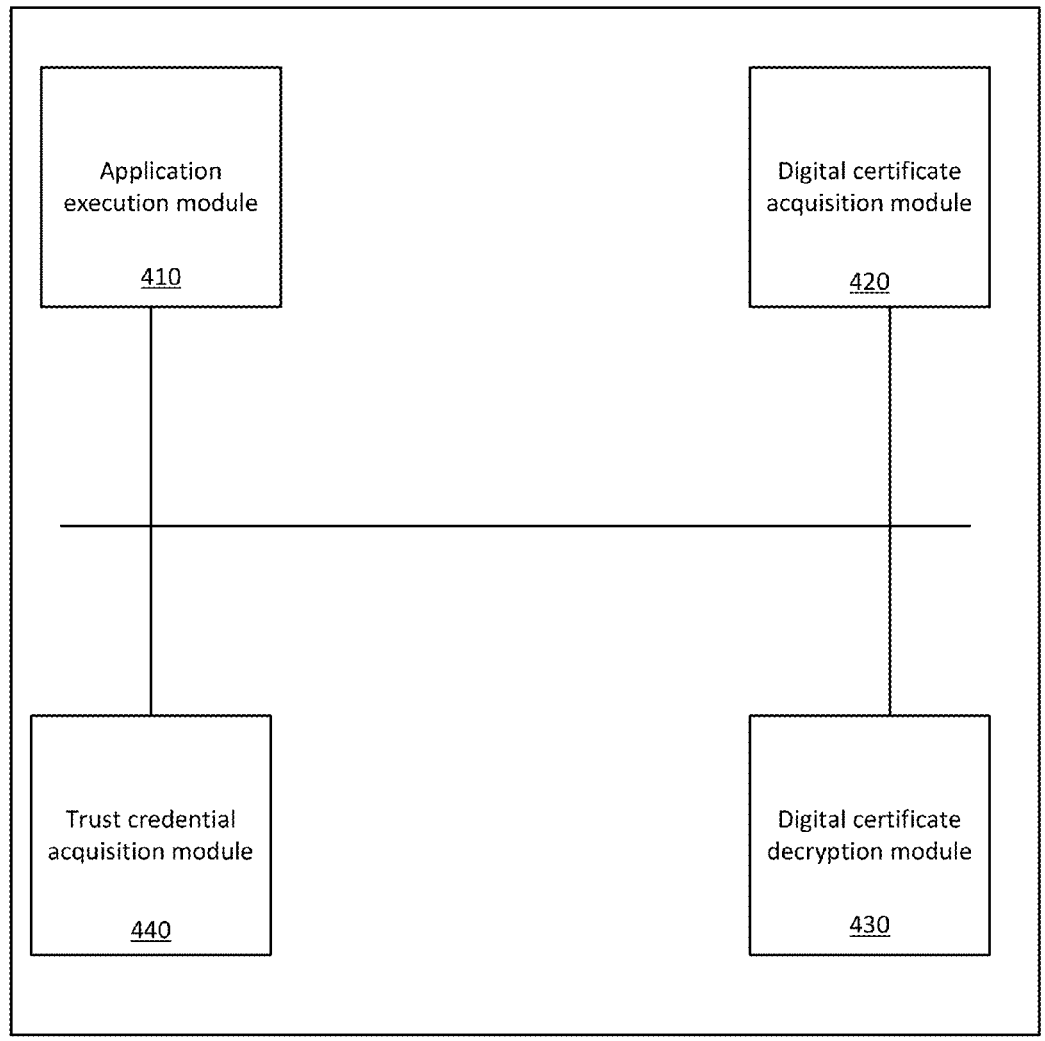
FIG. 4 illustrates example functional components of an example system.

FIG. 4 illustrates example functional components of an example system 400. In some implementations, system 400 may include functional components implemented by a device, such as user device 210. In some other implementations, system 400 may include functional components implemented by one or more devices, which include or exclude user device 210. For example, servers 220-240 may include some or all of the functional components of system 400.

As shown in FIG. 4, system 400 may include application execution module 410, digital certificate acquisition module 420, digital certificate decryption module 430, and/or trust credential acquisition module 440.

In some implementations, application execution module 410 may receive an indication of a selection of an application, associated with user device 210 (e.g., an application to perform tasks, such as accessing content, sending and/or receiving e-mails, etc.). In some implementations, the application may include a link to communicate with registration server 230 (e.g., to receive a digital certificate and/or trust credentials). Based on receiving the indication of the selection, application execution module 410 may open the selected application on user device 210 and identify whether user device 210 is storing a digital certificate (e.g., in storage device 325, associated with user device 210).

Digital certificate acquisition module 420 may receive an indication (e.g., from application execution module 410), that user device 210 does not store a digital certificate. In some implementations, digital certificate acquisition module 420 may execute an instruction to request a digital certificate from registration server 230 (e.g., by selecting the link associated with registration server 230), based on receiving the indication that user device 210 does not store a digital certificate. In some implementations, digital certificate acquisition module 420 may request the digital certificate from registration server 230 based on providing registration server 230 with an application ID, a device ID, a random number (e.g., a nonce N), and an encrypted random number.

For example, digital certificate acquisition module 420 may identify an application ID and a key (e.g., a public or private 128-bit AES key, or some other key) associated with the selected application of application execution module 410 (e.g., by identifying the application ID and key embedded in the selected application). Additionally, digital certificate acquisition module 420 may identify a device ID, associated with user device 210 (e.g., an international mobile equipment identity (IMEI) number, an integrated circuit card identification (ICCID) number, and/or some other identifier). In some implementations, digital certificate acquisition module 420 may generate a random number (e.g., a nonce N), and may generate an encrypted random number. For example, digital certificate acquisition module 420 may include an algorithm to generate the encrypted random number based on the random number and the key associated with the selected application. Alternatively, digital certificate acquisition module 420 may generate the encrypted random number using some other technique. In some implementations, digital certificate acquisition module 420 may provide the application ID, the device ID, the random number, and the encrypted random number to registration server 230 (e.g., as an input for a request for a digital certificate).

Digital certificate decryption module 430 may receive an encrypted digital certificate from registration server 230 (e.g., based on digital certificate acquisition module 420 requesting the digital certificate from registration server 230). In some implementations, digital certificate decryption module 430 may execute a decryption algorithm to decrypt the encrypted digital certificate. For example, digital certificate decryption module 430 may receive the random number generated by digital certificate acquisition module 420, and may receive the key identified by digital certificate acquisition module 420. Digital certificate decryption module 430 may decrypt the encrypted digital certificate based on the random number, the key, and/or some other parameter. In some implementations, digital certificate decryption module 430 may store the decrypted digital certificate in a secure storage device (e.g., storage device 325), associated with user device 210.

Trust credential acquisition module 440 may execute an instruction to request trust credentials from registration server 230 (e.g., based on digital certificate decryption module 430 decrypting and storing an encrypted digital certificate received from registration server 230, or by receiving an indication from application execution module 410 that user device 210 stores a digital certificate). In some implementations, trust credential acquisition module 440 may provide registration server 230 with the application ID, associated with the selected application of, the device ID, associated with user device 210, and the digital certificate received and decrypted by digital certificate decryption module 430 (e.g., as an input for the request for trust credentials). Trust credential acquisition module 440 may receive encrypted trust credentials and a key from registration server 230 (e.g., based on the request for trust credentials), and may decrypt the encrypted trust credentials based on the key. Additionally, trust credential acquisition module 440 may store the decrypted trust credentials in a secure storage device (e.g., storage device 325) of user device 210.

Figure 5:
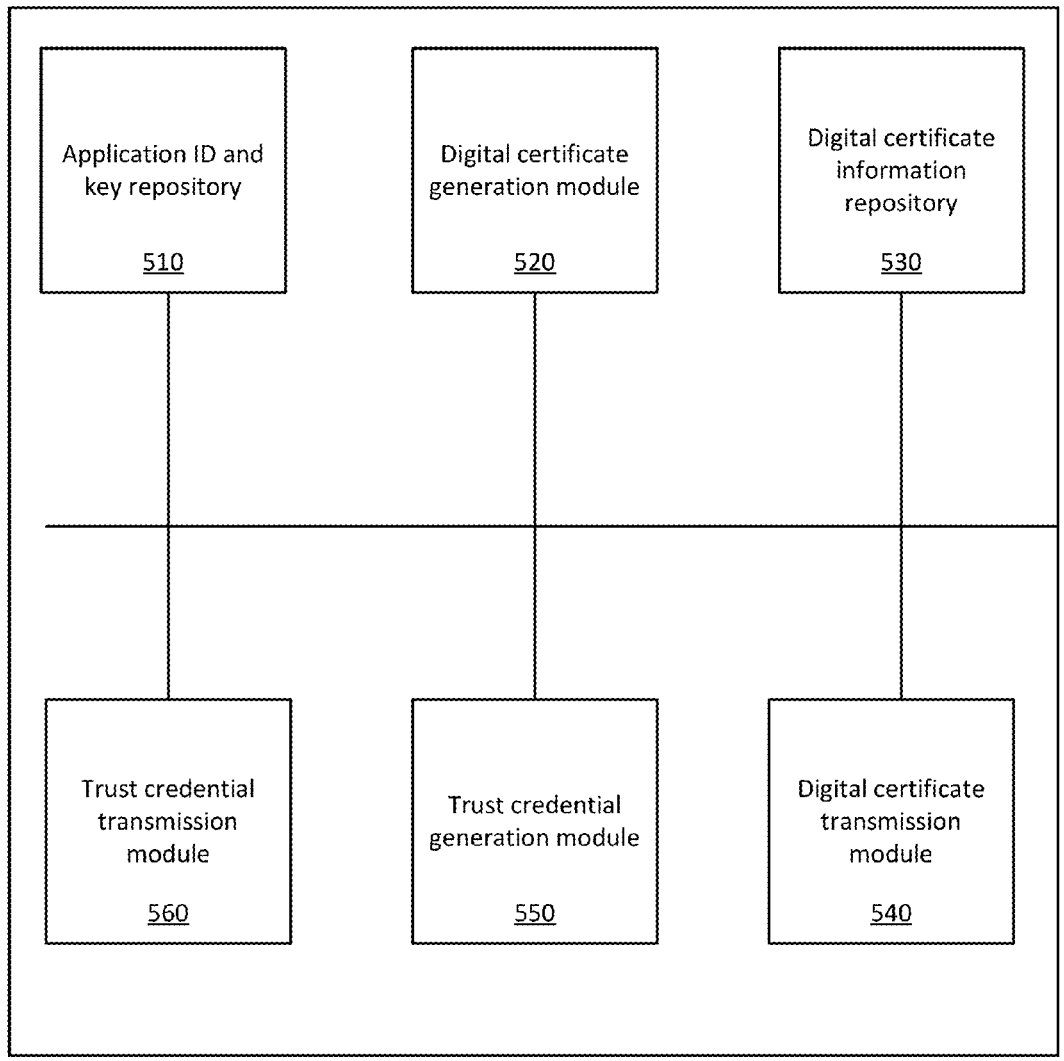
FIG. 5 illustrates example functional components of an example system.

FIG. 5 illustrates example functional components of an example system 500. In some implementations, system 500 may include functional components implemented by a server, such as registration server 230. In some other implementations, system 500 may include functional components implemented by one or more devices, which includes registration server 230. For example, servers 220 and 240 may include some or all of the functional components of system 500.

As shown in FIG. 5, system 500 may include application ID and key repository 510, digital certificate generation module 520, digital certificate information repository 530, digital certificate transmission module 540, trust credential generation module 550, and/or trust credential transmission module 560.

Application ID and key repository 510 may store information for an application (e.g., an application for user device 210) which may cause user device 210 to access app server 240 to perform tasks via user device 210 (e.g., access content, send and/or receive e-mail, etc.). In some implementations, application ID and key repository 510 may store information for the application, such as an application ID, an application name, a key (e.g., a public or private 128-bit AES key, or some other key), and/or some other information.

Digital certificate generation module 520 may receive a request for a digital certificate (e.g., from user device 210), and may generate, encrypt, and send a digital certificate to user device 210 based on the request for the digital certificate. For example, digital certificate generation module 520 may receive an application ID, a device ID, a random number, and/or an encrypted random number from user device 210 (e.g., as an input for a request for a digital certificate). In some implementations, digital certificate generation module 520 may identify a key, associated with the received application ID (e.g., based on information stored by application ID and key repository 510), and may decrypt the encrypted random number (e.g., based on the key or some other technique).

In some implementations, digital certificate generation module 520 may authenticate user device 210 to receive the digital certificate based on identifying that the decrypted random number matches the random number received from user device 210. Alternatively, digital certificate generation module 520 may authenticate user device 210 to receive the digital certificate based on encrypting the random number received from user device 210 (e.g., based on the key or some other technique), and identifying that the encrypted random number, generated by digital certificate generation module 520, matches the encrypted random number received from user device 210. In some implementations, digital certificate generation module 520 may generate a digital certificate, based on authenticating user device 210 to receive the digital certificate, as described above. Additionally, digital certificate generation module 520 may assign a digital certificate ID, and/or a security version number (SVN), associated with the digital certificate (e.g., to identify whether the digital certificate is up to date). In some implementations, digital certificate generation module 520 may embed the digital certificate ID and/or the SVN in a header of the digital certificate.

Digital certificate information repository 530 may receive and/or store information for a digital certificate based on digital certificate generation module 520 generating the digital certificate. For example, digital certificate information repository 530 may store information associated with a digital certificate, such as a digital certificate ID, an SVN (e.g., the SVN assigned to the digital certificate by digital certificate generation module 520), a current SVN (e.g., an SVN to identify whether the digital certificate is current), a key, and/or a device ID received by digital certificate generation module 520. In some implementations, the key stored by digital certificate information repository 530 may correspond to the key associated with digital certificate generation module 520. In some other implementations, the key stored by digital certificate information repository 530 may include some other key.

In some implementations, digital certificate transmission module 540 may encrypt the digital certificate generated by digital certificate generation module 520 (e.g., based on the random number received by digital certificate generation module 520 and/or the key associated with the application ID received by digital certificate generation module 520). Further, digital certificate transmission module 540 may transmit or send the encrypted digital certificate to user device 210. In some implementations, digital certificate transmission module 540 may transmit the encrypted digital certificate to user device 210 using a secure transfer protocol, such as the HTTPS protocol, or some other protocol.

In some implementations, trust credential generation module 550 may receive a request for trust credentials from user device 210. For example, trust credential generation module 550 may receive a digital certificate, an application ID, and a device ID from user device 210 (e.g., as an input for a request for trust credentials). Trust credential generation module 550 may identify a digital certificate ID and an SVN, associated with the digital certificate (e.g., based on the digital certificate ID and SVN embedded within the digital certificate). Additionally, trust credential generation module 550 may identify device ID information, associated with the digital certificate ID. In some implementations, trust credential generation module 550 may authenticate user device 210 (e.g., to receive trust credentials), based on determining that the device ID associated with the digital certificate ID matches the device ID received from user device 210.

In some implementations, trust credential generation module 550 may identify whether the digital certificate received from user device 210 is up to date by determining whether the SVN, of the digital certificate received from user device 210, matches the current SVN stored by digital certificate information repository 530. Digital certificate generation module 550 may instruct user device 210 to update the digital certificate received from user device 210 based on determining that the SVN, of the digital certificate received from user device 210, does not match the current SVN stored by digital certificate information repository 530. Alternatively, trust credential generation module 550 may determine that the digital certificate received from user device 210 is up to date by identifying that the SVN, of the digital certificate received from user device 210, matches the SVN stored by digital certificate information repository 530. In some implementations, trust credential generation module 550 may generate a set of trust credentials for user device 210 based on authenticating user device 210 and determining that the digital certificate received from user device 210 is up to date. In some implementations, the trust credentials may be in the form of a permanent session token or some other form.

Trust credential transmission module 560 may encrypt the set of trust credentials generated by trust credential generation module 550 based on a key associated with the digital certificate ID of the digital certificate received by trust credential generation module 550 from user device 210. For example, trust credential transmission module 560 may identify a key, associated with the digital certificate ID, based on information stored by digital certificate information repository 530. Alternatively, trust credential transmission module 560 may encrypt the set of trust credentials generated by trust credential generation module 550 based on some other key or some other technique. In some implementations, trust credential transmission module 560 may transmit the encrypted set of trust credentials and the key to user device 210 (e.g., using a secure transfer protocol, such as the HTTPS protocol, or some other protocol).

Figure 6:
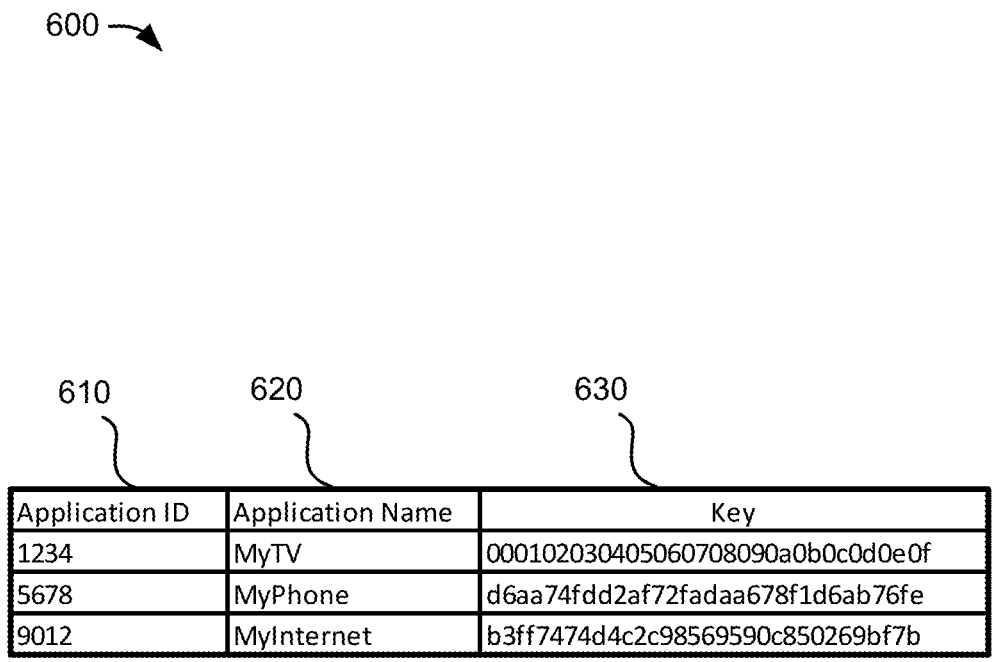
FIG. 6 illustrates an example data structure that may be stored by one or more servers, such as a registration server.

FIG. 6 illustrates an example data structure 600 that may be stored by one or more servers, such as registration server 230. In one implementation, data structure 600 may be stored in a memory of registration server 230. In another implementation, data structure 600 may be stored in a memory separate from, but accessible by registration server 230. Each entry, associated with data structure 600, may correspond to information for an application (e.g., an application for user device 210 to permit user device 210 to access app server 240 to perform a task). In some implementations, digital certificate generation module 520 may generate a digital certificate for user device 210 based on information stored by data structure 600.

A particular instance of data structure 600 may contain different information and/or fields than another instance of data structure 600. Additionally, or alternatively, data structure 600 may be stored by app server 240 based on receiving information associated with a corresponding application. In some implementations, data structure 600 may correspond to information stored by application ID and key repository 510.

As shown in FIG. 6, data structure 600 may include application ID field 610, app name field 620, and/or key field 630. In some implementations, data structure 600 may include additional fields, fewer fields, different fields, or differently arranged fields than are shown in FIG. 6.

Application ID field 610 may include a unique string of characters (e.g., "1234") to identify an application stored by app host server 220, which may permit user device 210 to access app server 240 (e.g., to perform tasks, such as accessing content, sending and/or receiving e-mail, etc.). Application ID field 610 may correspond to an entry to identify information for an application registered with registration server 230. While the examples of information stored by application ID field 610 include 4 numerical characters, in practice, application ID field 610 may store any character string of any length.

Application name field 620 may include a description of an application stored by app host server 220 and registered with registration server 230. In some implementations, information stored by application name field 620 may correspond to an application ID stored by application ID field 610. For example, the application with the application ID "1234" may correspond to the application with the application name "MyTV."

Key field 630 may store information for a key (e.g., a public or private 128-bit AES key, or some other key), associated with a particular application. For example, the key "000102030405060708090a0b0c0d0e0f" may be associated with the application with the application ID "1234" and the application name "MyTV." In some implementations, information in key field 630 may be stored by the corresponding application (e.g., embedded within the corresponding application). For example, the application with the application name "MyTV" may include the key "000102030405060708090a0b0c0d0e0f." As described above, user device 210 may generate an encrypted random number based on the key associated with the application. Additionally, digital certificate decryption module 430 may decrypt the random number based on information stored by key field 630, associated with an application ID received from user device 210.

FIG. 7 illustrates an example data structure 700 that may be stored by one or more servers, such as registration server 230. In one implementation, data structure 700 may be stored in a memory of registration server 230. In another implementation, data structure 700 may be stored in a memory separate from, but accessible by, registration server 230. Each entry, associated with data structure 700, may correspond to information for a digital certificate (e.g., a digital certificate generated by digital certificate generation module 520). In some implementations, trust credential generation module 550 may generate a set of trust credentials for user device 210 based on information stored by data structure 700.

A particular instance of data structure 700 may contain different information and/or fields than another instance of data structure 700. Additionally, or alternatively, data structure 700 may be stored by app server 240 based on receiving information associated with a digital certificate. In some implementations, data structure 700 may correspond to information stored by digital certificate information repository 530.

As shown in FIG. 7, data structure 700 may include digital certificate ID field 710, SVN field 720, current SVN field 730, key field 740, and/or device ID field 750. In some implementations, data structure 700 may include additional fields, fewer fields, different fields, or differently arranged fields than are shown in FIG. 7.

Digital certificate ID field 710 may include a unique string of characters (e.g., "3456") to identify digital certificates generated by digital certificate generation module 520. Digital certificate ID field 710 may correspond to an entry to identify information for a respective digital certificate. While the examples of information stored by digital certificate ID field 710 include 4 numerical characters, in practice, digital certificate ID field 710 may store any character string of any length.

SVN field 720 may store information identifying an SVN for a corresponding digital certificate. For example, as described above with respect to digital certificate generation module 520, a digital certificate may include an SVN to identify whether the digital certificate is up to date. SVN field 720 may store the SVN based on digital certificate generation module 520 generating a digital certificate and assigning an SVN to the digital certificate. For example, SVN field 720 may store a version number of 1.5.1 associated with the digital certificate with the digital certificate ID of "3456."

Current SVN field 730 may store information identifying a current SVN for a corresponding digital certificate. In some implementations, trust credential generation module 550 may identify if a digital certificate is up to date based on information stored by SVN field 720 and current SVN field 730. For example, as described above, trust credential generation module 550 may identify whether a digital certificate is up to date based on comparing the SVN and the current SVN associated with the digital certificate.

Key field 740 may store information for a key (e.g., a public or private 128-bit AES key, or some other key), associated with a particular digital certificate. For example, the key "3caaa3e8a99f9deb50f3af57adf622aa" may be associated with the digital certificate with the digital certificate ID "3456." In some implementations, information in key field 740 may correspond to information in key field 630 of data structure 600. Trust credential generation module 550 may encrypt a set of trust credentials based on information stored by key field 740, associated with a digital certificate received from user device 210.

Device ID field 750 may store information for user device 210 corresponding to a particular digital certificate. For example, device ID field 750 may store an IMEI value and/or an ICCID value associated with a device ID received by digital certificate generation module 520 from user device 210 (e.g., as an input for a request for a digital certificate). As shown in FIG. 7, device ID field 750 may store an IMEI value of "4587412365189541" and an ICCID value of "8991101200003243421" for the digital certificate associated with digital certificate ID "3456." In some implementations, trust credential generation module 550 may authenticate a digital certificate received by user device 210 (e.g., as an input for a request for a set of trust credentials), based on information stored by device ID field 750.

Figure 8:
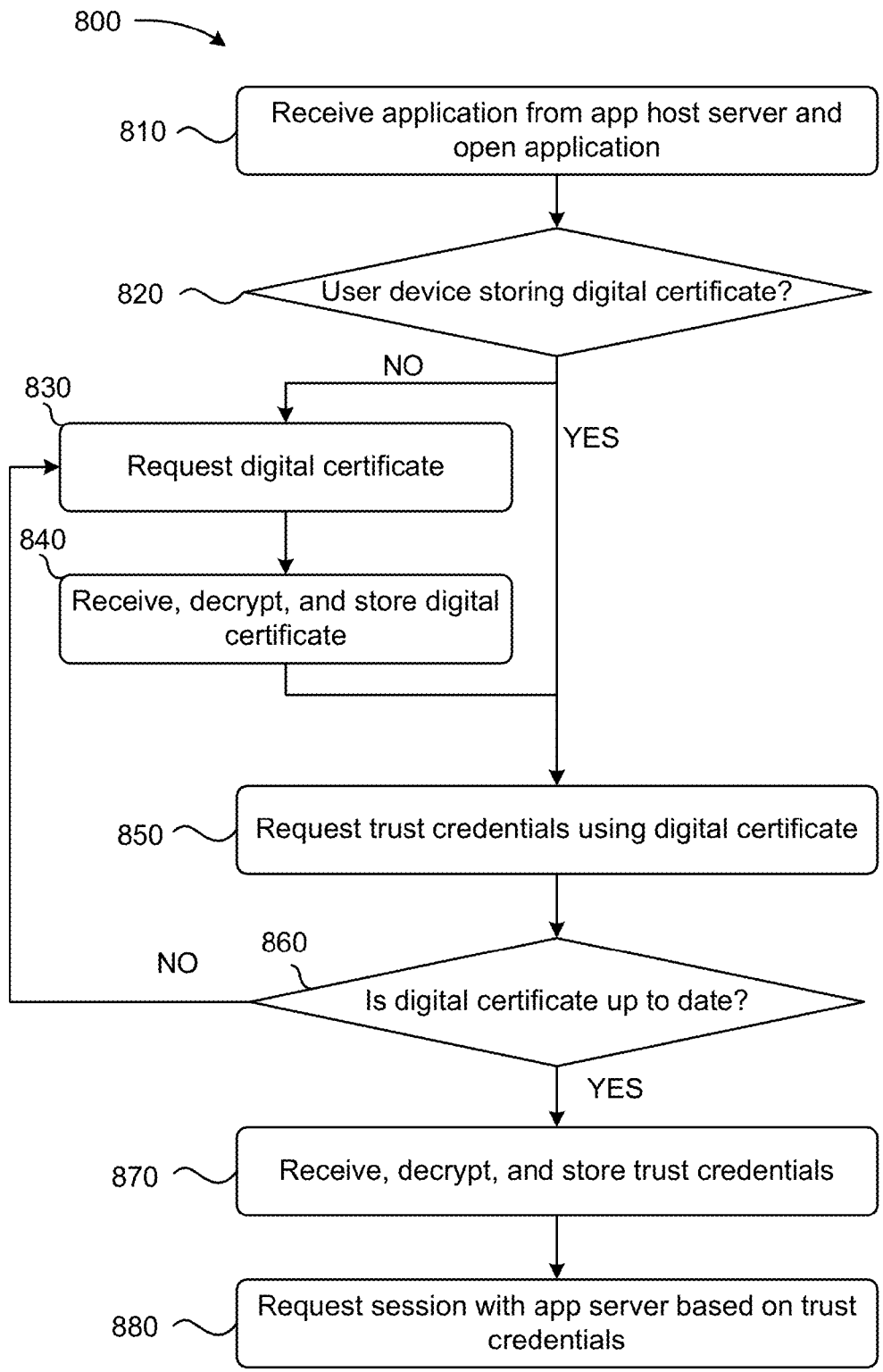
FIG. 8 illustrates a flowchart of an example process for receiving a digital certificate and/or a set of trust credentials.

FIG. 8 illustrates a flowchart of an example process 800 for receiving a digital certificate and/or a set of trust credentials. In one implementation, process 800 may be performed by one or more components of user device 210, such as processor 310 of user device 210. In another implementation, one or more blocks of process 800 may be performed by one or more components of another device (e.g., servers 220-240), or a group of devices including or excluding user device 210.

Process 800 may include receiving an application from app host server 220 and opening the application (block 810). For example, user device 210 may receive (e.g., download) an application (e.g., an application to perform tasks, such as accessing content, sending and/or receiving e-mail, etc.) from app host server 220 and open the application based on receiving an instruction from a user, associated with user device 210, to download and open the application.

Process 800 may also include determining whether user device 210 is storing a digital certificate (block 820). For example, as described above with respect to application execution module 410, user device 210 may identify (e.g., based on opening the application) that user device 210 does not store a digital certificate. Alternatively, user device 210 may identify that user device 210 does store a digital certificate (e.g., in storage device 325 of user device 210).

If user device 210 is not storing a digital certificate (block 820-NO), process 800 may include requesting a digital certificate (block 830). For example, as described above with respect to digital certificate acquisition module 420, user device 210 may execute an instruction to request a digital certificate from registration server 230, based on receiving an indication, from application execution module 410, that user device 210 does not store a digital certificate. In some implementations, user device 210 may request the digital certificate from registration server 230 based on providing registration server 230 with an application ID, a device ID, a random number, and/or an encrypted random number generated based on the random number and a key associated with the application.

Process 800 may further include receiving, decrypting, and storing the digital certificate (block 840). For example, as described above to digital certificate decryption module 430, user device 210 may receive an encrypted digital certificate from registration server 230 (e.g., based on digital certificate acquisition module 420 executing an instruction to request the digital certificate from registration server 230), and may decrypt the encrypted digital certificate based on the random number generated by digital certificate acquisition module 420 and/or a key associated with the application. In some implementations, user device 210 may store the decrypted digital certificate in a secure storage device (e.g., storage device 325), associated with user device 210, based on decrypting the encrypted digital certificate. In some implementations, user device 210 may overwrite an existing digital certificate that may be stored by the secure storage device (e.g., in an implementation in which user device 210 receives a digital certificate with an updated SVN).

Process 800 may further include requesting trust credentials using the digital certificate (block 850). For example, as described above with respect to trust credential acquisition module 440, user device 210 may execute an instruction to request trust credentials from registration server 230. In some implementations, user device 210 may provide registration server 230 with the application ID, associated with the selected application of application execution module 410, the device ID, associated with user device 210, and the digital certificate received and decrypted by digital certificate decryption module 430 (e.g., as an input for the request for trust credentials).

Process 800 may also include identifying whether the digital certificate is up to date (block 860). For example, as described above with respect to trust credential generation module 550, user device 210 may receive an indication from registration server 230 that the SVN, associated with the digital certificate, is not up to date, based on the registration server 230 determining that the SVN, of the digital certificate received from user device 210, does not match the current SVN stored by digital certificate information repository 530.

Alternatively, user device 210 may receive an indication that the SVN is up to date based on the registration server 230 determining that the SVN, of the digital certificate received from user device 210, matches the current SVN stored by digital certificate information repository 530.

If user device 210 receives an indication that the digital certificate is not up to date (block 860-NO), process 800 may include requesting a digital certificate (block 830). For example, user device 210 may request a digital certificate, in a similar manner as described above, thereby updating the SVN associated with the digital certificate. Process 800 may also include receiving, decrypting, and storing the digital certificate (block 840), and requesting trust credentials using the digital certificate (block 850), as described above.

If, on the other hand, user device 210 receives an indication that the SVN is up to date (block 860-YES), process 800 may further include receiving, decrypting, and storing the trust credentials (block 870). For example, as described above with respect to trust credential acquisition module 440, user device 210 may receive encrypted trust credentials and a key from registration server 230 (e.g., based on the request for trust credentials), and may decrypt the encrypted trust credentials based on the key. Additionally, user device 210 may store the decrypted trust credentials in a secure storage device (e.g., storage device 325) of user device 210.

Process 800 may also include requesting a session with app server 240 based on the trust credentials (block 880). For example, as described above, user device 210 may communicate with app server 240, via a session with app server 240, to perform tasks, associated with an application. User device 210 may provide the trust credentials to app server 240 to communicate with app server 240 in lieu of providing some other credentials, such as a username and/or a password, thereby improving the user experience associated with performing tasks via user device 210.

In some implementations, user device 210 may identify a digital certificate in a secure storage device of user device 210 (block 820-YES). In this case, process 800 may omit blocks 830-840 and may include blocks 850-880, as described above.

Figure 9:
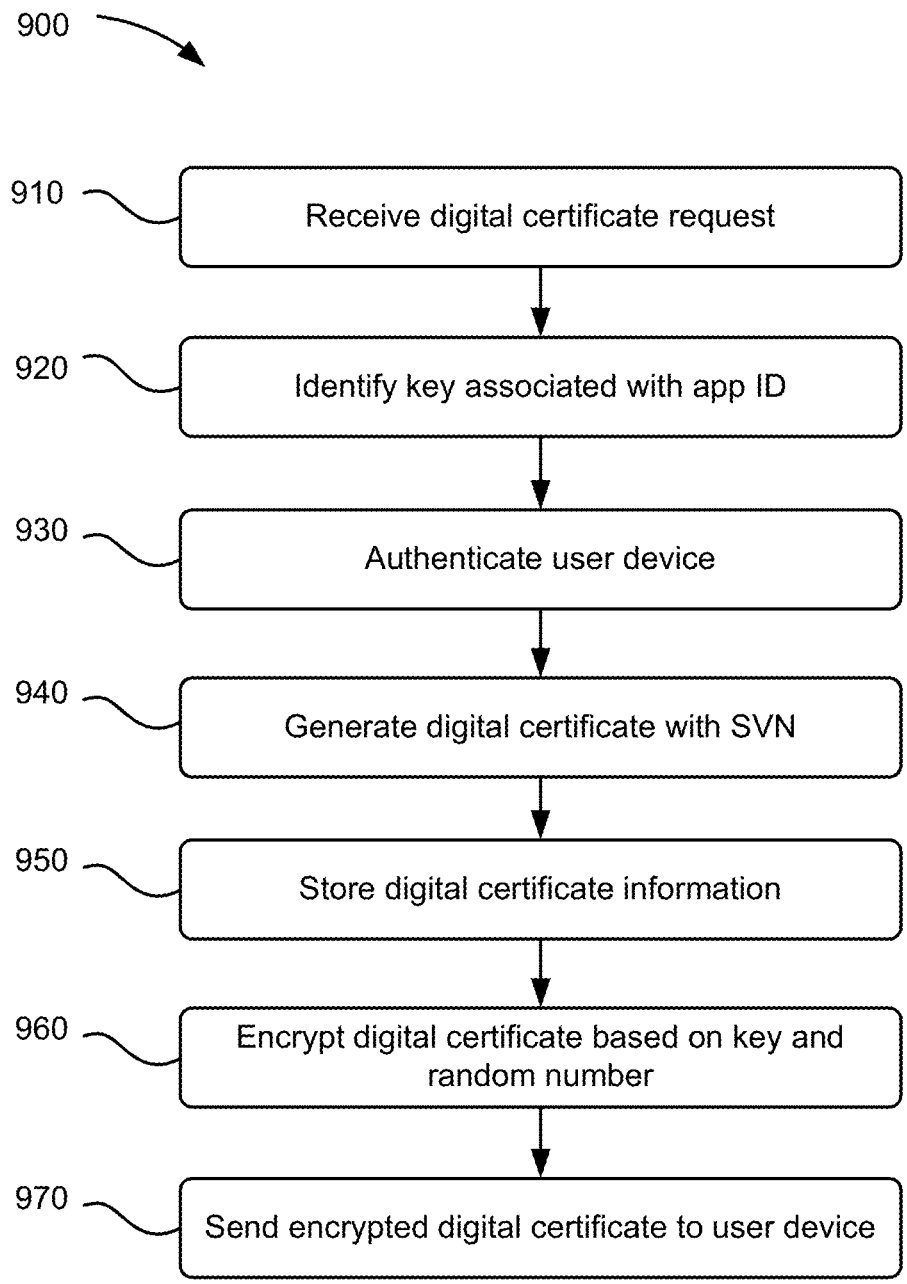
FIG. 9 illustrates a flowchart of an example process for providing a digital certificate to a user device.

FIG. 9 illustrates a flowchart of an example process 900 for providing a digital certificate to user device 210. In one implementation, process 900 may be performed by one or more components of registration server 230, such as processor 310 of registration server 230. In another implementation, one or more blocks of process 900 may be performed by one or more components of another device (e.g., servers 220 and/or 240), or a group of devices including or excluding registration server 230.

Process 900 may include receiving a digital certificate request (block 910). For example, as described above with respect to digital certificate generation module 520, registration server 230 may receive a request for a digital certificate (e.g., from user device 210). In some implementations, registration server 230 may receive an application ID, a device ID, a random number, and/or an encrypted random number from user device 210 (e.g., as an input for a request for a digital certificate).

Process 900 may further include, identifying a key associated with the application ID. For example, as described above with respect to digital certificate generation module 520, registration server 230 may identify a key associated with the received application ID (e.g., based on information stored by application ID and key repository 510 and/or data structure 600).

Process 900 may also include authenticating user device 210 (block 930). For example, registration server 230 may decrypt the encrypted random number (e.g., based on the key, associated with the application ID, or some other technique). Registration server 230 may authenticate user device 210 based on identifying that the decrypted random number matches the random number received from user device 210. Alternatively, registration server 230 may authenticate user device 210 to receive the digital certificate based on encrypting the random number received from user device 210 (e.g., based on the key or some other technique), and identifying that the encrypted random number, generated by registration server 230, matches the encrypted random number received from user device 210.

Process 900 may include generating a digital certificate with an SVN (block 940). For example, as described above with respect to digital certificate generation module 520, registration server 230 may generate a digital certificate, based on authenticating user device 210 to receive the digital certificate. Additionally, registration server 230 may assign a digital certificate ID, and/or a security version number (SVN), associated with the digital certificate (e.g., to identify whether the digital certificate is up to date). Registration server 230 may embed the digital certificate ID and/or the SVN in a header of the digital certificate, or may store the digital certificate ID and/or the SVN in some other location.

Process 900 may further include storing digital certificate information (block 950). For example, as described above with respect to digital certificate information repository 530, registration server 230 may store information associated with the digital certificate, such as a digital certificate ID, an SVN (e.g., the SVN assigned to the digital certificate by digital certificate generation module 520), a current SVN (e.g., an SVN to identify whether the digital certificate is current), a key, and/or a device ID received by digital certificate generation module 520. In some implementations, digital certificate information may be stored by data structure 700.

Process 900 may also include encrypting the digital certificate based on a key and a random number (block 960). For example, as described above with respect to digital certificate transmission module 540, registration server 230 may encrypt the digital certificate generated by digital certificate generation module 520 (e.g., based on the random number received by digital certificate generation module 520 and/or the key associated with the application ID received by digital certificate generation module 520).

Process 900 may further include sending the encrypted digital certificate to user device 210. For example, as described above with respect to digital certificate transmission module 540, registration server 230 may transmit the encrypted digital certificate to user device 210 using a secure transfer protocol, such as the HTTPS protocol, or some other protocol.

Figure 10:
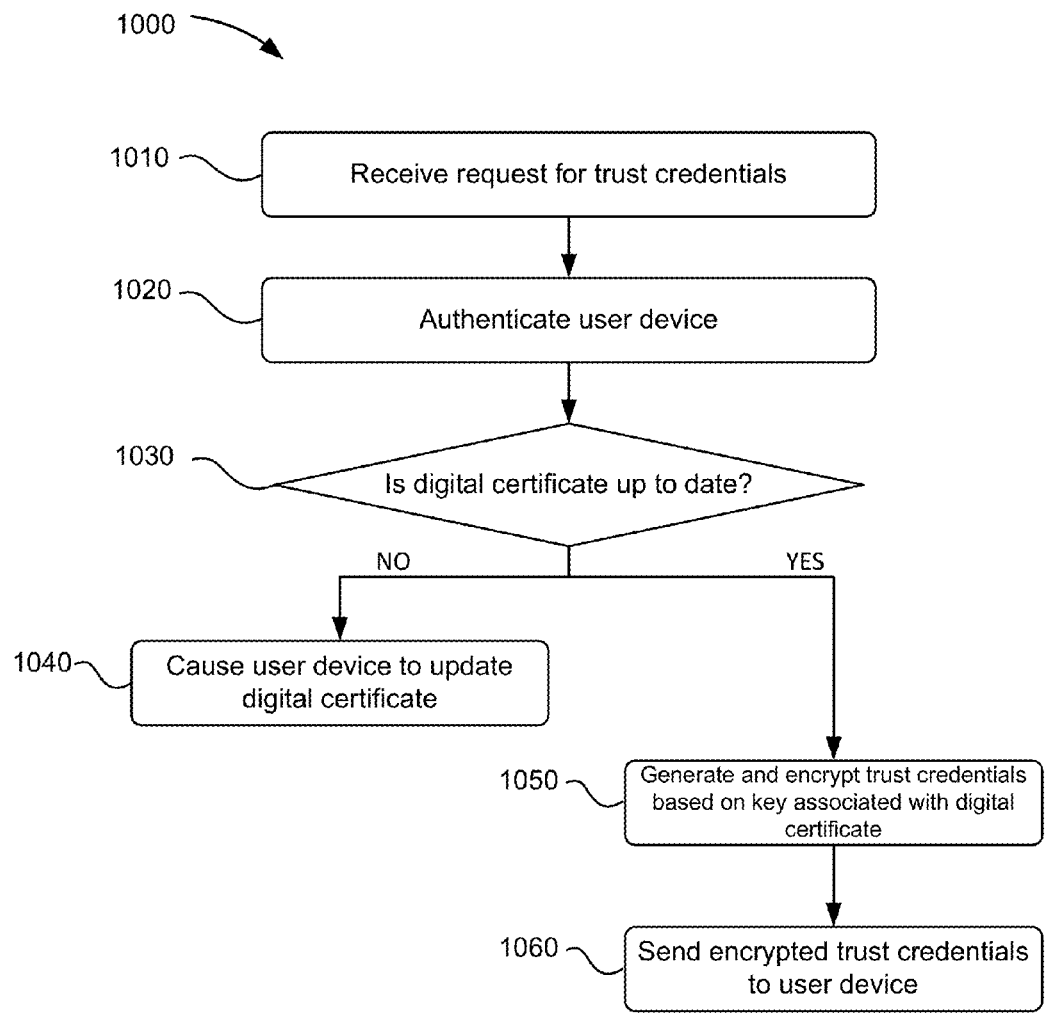
FIG. 10 illustrates a flowchart of an example process for providing a set of trust credentials to a user device.

FIG. 10 illustrates a flowchart of an example process 1000 for providing a set of trust credentials to user device 210. In one implementation, process 1000 may be performed by one or more components of registration server 230, such as processor 310 of registration server 230. In another implementation, one or more blocks of process 1000 may be performed by one or more components of another device (e.g., servers 220 and/or 240), or a group of devices including or excluding registration server 230.

Process 1000 may include receiving a request for trust credentials (block 1010). For example, as described above with respect to trust credential generation module 550, registration server 230 may receive a request for trust credentials from user device 210. In some implementations, registration server 230 may receive a digital certificate, an application ID, and/or a device ID from user device 210 (e.g., as an input for a request for trust credentials).

Process 1000 may also include authenticating user device 210 (block 1020). For example, as described above with respect to trust credential generation module 550, registration server 230 may identify a digital certificate ID and an SVN, associated with the digital certificate (e.g., based on the digital certificate ID and SVN embedded within the digital certificate). Additionally, registration server 230 may identify device ID information, associated with the digital certificate ID. In some implementations, registration server 230 may authenticate user device 210 (e.g., to receive trust credentials), based on determining that the device ID associated with the digital certificate ID matches the device ID received from user device 210.

Process 1000 may further include determining whether the digital certificate is up to date (block 1030). For example, as described above with respect to trust credential generation module 550, registration server 230 may determine whether the SVN, of the digital certificate received from user device 210, matches the current SVN stored by digital certificate information repository 530.

If the digital certificate is not up to date—e.g., when registration server 230 determines that the SVN of the digital certificate received from user device 210 does not match the current SVN stored by digital certificate information repository 530 (block 1030-NO), process 1000 may further include causing the user device to update the digital certificate (block 1040). For example, registration server 230 may send an instruction to user device 210 to request a digital certificate in a manner similar as described above.

If, on the other hand, the digital certificate is up to date—e.g., when registration server 230 determines that the SVN of the digital certificate received from user device 210 matches the current SVN stored by digital certificate information repository 530 (block 1030-YES), process 1000 may further include generating and encrypting trust credentials based on the key associated with the digital certificate (block 1050). For example, as described above with respect to trust credential generation module 550, registration server 230 may generate a set of trust credentials for user device 210 based on authenticating user device 210 and determining that the digital certificate received from user device 210 is up to date. In some implementations, the trust credentials may be in the form of a permanent session token or some other form. As described above with respect to trust credential transmission module 560, registration server 230 may encrypt the set of trust credentials based on a key associated with the digital certificate ID of the digital certificate received by registration server 230 from user device 210.

Process 1000 may also include sending encrypted trust credentials to user device 210 (block 1060). For example, as described above with respect to trust credential transmission module 560, registration server 230 may transmit the encrypted set of trust credentials and the key to user device 210 (e.g., using a secure transfer protocol, such as the HTTPS protocol, or some other protocol).

As described above, registration server 230 may provide trust credentials to user device 210, based on receiving parameters such as a digital certificate, an application ID, and/or a device ID from user device 210. Registration server 230 may authenticate user device 210 based on the received parameters and the trust credential parameters associated with an application that has been verified as originating from a trusted source (e.g., using a testing and/or verification process). As a result, registration server 230 may not authenticate user device 210 based on trust credential parameters associated with an unverified application, thereby ensuring that user device 210 may receive trust credentials when executing a verified application but may not receive the trust credentials when executing an unverified application.

Figure 11:
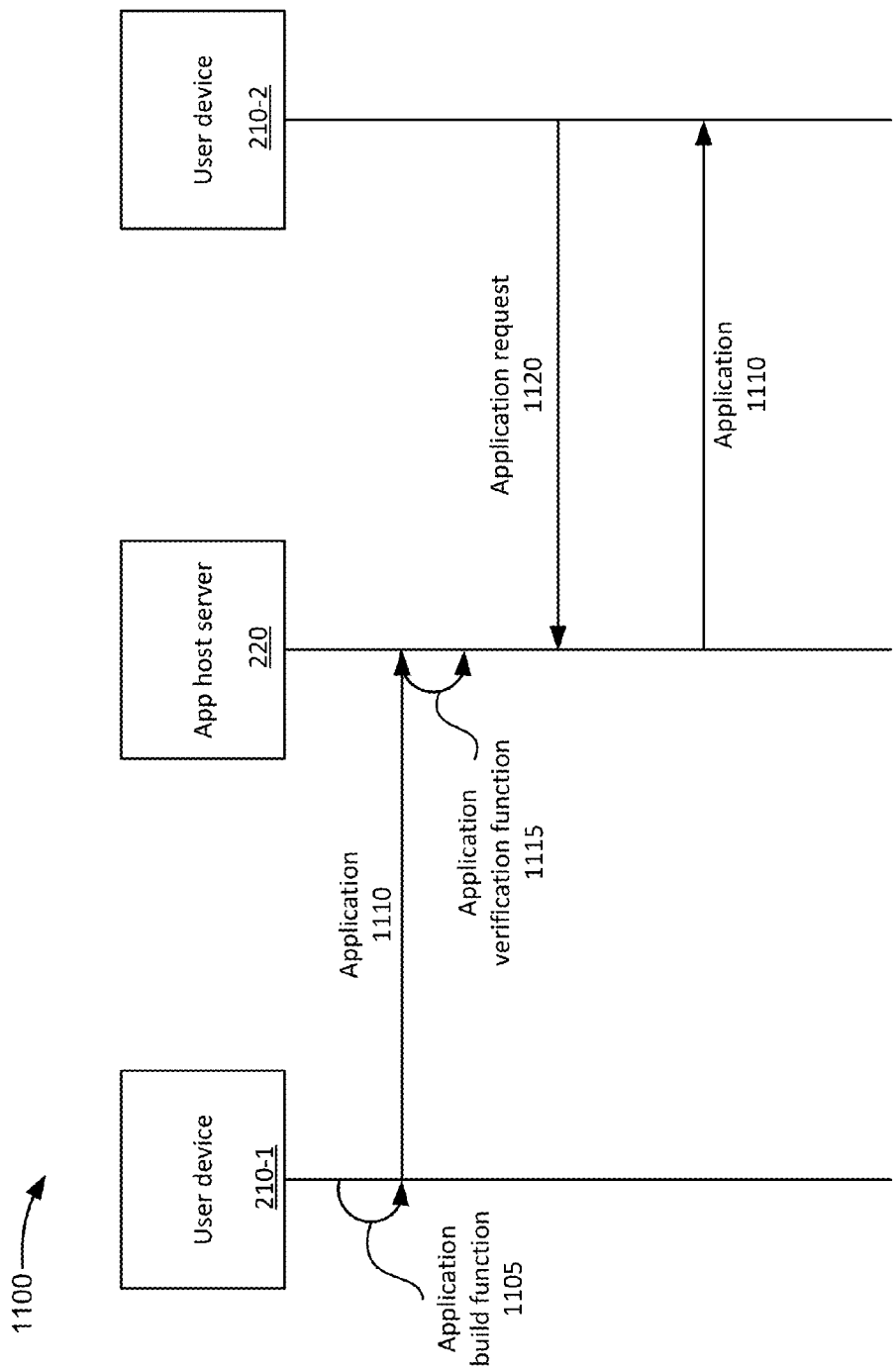
FIG. 11 illustrates a call flow diagram of example operations capable of being performed by an example portion of the environment in FIG. 2.

FIG. 11 illustrates a call flow diagram of example operations capable of being performed by an example portion 1100 of environment 200. As shown in FIG. 11, portion 1100 may include multiple user devices 210 (e.g., user device 210-1 and/or user device 210-2) and app host server 220. User devices 210 and app host server 220 may include components and/or perform functions described above in connection with, for example, FIGS. 1 and 2.

FIG. 11 may correspond to example operations and/or functions to deliver a verified application having trust credential parameters to user device 210. As described above, app host server 220 may store an application with trust credentials based on the application being verified (e.g., verified as originating from a trusted source).

User device 210-1 may include a computing device, or a collection of computing devices. In some implementations, a user may build and/or develop an application (e.g., an application to perform a task, such as accessing content, sending and/or receiving e-mail, etc.) using user device 210-1. For example, user device 210-1 may be used to perform app build function 1105.

In some implementations, app build function 1105 may include a process to build and/or develop an application by a verified application developer registered with registration server 230. For example, app build function 1105 may include building the application and registering the application with registration server 230. Additionally, app build function 1105 may include receiving trust credential parameters, such as an app ID and a key based on registering the application with registration server 230. App build function 1105 may further include storing the app ID and the key into the application and signing the application (e.g., to indicate that the application was developed by a verified application developer). In some implementations, app build function 1105 may include building a security module within the application to generate an encrypted random number based on a random number and the key.

In some implementations, user device 210-1 may send application 1110 to app host server 220 based on building and registering application 1110 as described above with respect to app build function 1105. App host server 220 may initiate app verification function 1115 based on receiving application 1110.

App verification function 1115 may include verifying the signature, associated with application 1110 (e.g., to ensure that application 1110 is associated with a registered application developer), and to test and/or certify application 1110 (e.g., to ensure that application 1110 performs as intended). App host server 220 may store application 1110 based on verifying application 1110 as described above with respect to app verification function 1115.

In some implementations, app host server 220 may receive application request 1120 from user device 210-2. Application request 1120 may include a request from user device 210 to receive (e.g., download) application 1110 from app host server 220 (e.g., via a platform or user interface associated with user device 210-2). In some implementations, app host server 220 may send application 1110 to user device 210-2 based on application request 1120. As a result, user device 210-2 receives application 1110 which was originated from a verified source and includes trust credential parameters (e.g., app ID and/or a key). As described above, user device 210-2 may receive a digital certificate and/or trust credentials based on the trust credential parameters, associated with application 1110, and may not receive the digital certificate and/or trust credentials based on trust credential parameters associated with an application that does not originate from a verified source.

The foregoing description provides illustration and description, but is not intended to be exhaustive or to limit the possible implementations to the precise form disclosed. Modifications and variations are possible in light of the above disclosure or may be acquired from practice of the implementations. For example, while series of blocks have been described with regards to FIG. 8-10, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
receiving, by one or more servers, a request for a certificate from a user device,
the request including a first parameter, a second parameter, and a third parameter, and
the first parameter including an application identifier of an application;
identifying, by the one or more servers, a key based on the application identifier;
generating, by the one or more servers, a fourth parameter based on the key and the third parameter;
authenticating, by the one or more servers, the user device based on the fourth parameter and the second parameter;
generating, by the one or more servers, the certificate based on authenticating the user device;
storing, by the one or more servers, information associated with the certificate; and
sending, by the one or more servers, the certificate to the user device,
the user device using the certificate to establish a session to interact with an application server.

2. The method of claim 1, further comprising:
encrypting the certificate, based on the key and the second parameter, to form an encrypted certificate,
where sending the certificate to the user device includes sending the encrypted certificate to the user device.
3. The method of claim 1, where receiving the request for the certificate from the user device is based on the user device receiving the application from a verified source and selecting the application.
4. A method comprising:
receiving, by a user device, an application from a first server;
receiving, by the user device, an instruction to open the application;
determining, by the user device, whether the user device is storing a certificate associated with the application based on opening the application,
the certificate including information to receive credentials;
requesting, by the user device, the certificate from a second server when the user device is not storing the certificate;
receiving, by the user device, the certificate from the second server based on requesting the certificate,
the certificate being an encrypted certificate;
decrypting, by the user device, the certificate based on a key associated with the application;
storing, by the user device, the certificate in a secure storage, associated with the user device, based on receiving and decrypting the certificate;
requesting, by the user device and based on the certificate, the credentials from the second server,
the credentials including information to authenticate the user device to access a third server;
receiving, by the user device, the credentials from the second server;
storing, by the user device, the credentials in the secure storage associated with the user device; and
requesting a session with the third server using the credentials.
5. The method of claim 4,
where the application includes an identifier, and
where the key is associated with the identifier.
6. The method of claim 4, where the application includes credential parameters embedded within the application.
7. A system comprising:
one or more processors to:
receive, from a user device, a request for a certificate,
the request including a first parameter, a second parameter, and a third parameter, and
the first parameter including an application identifier of an application;
identify a key based on the application identifier;
generate a fourth parameter based on the key and the third parameter; authenticate the user device based on the fourth parameter and the second parameter;
generate the certificate based on authenticating the user device; and
send the certificate to the user device.
8. The system of claim 7,
where the fourth parameter comprises an encrypted random number, and
where, when authenticating the user device based on the fourth parameter and the second parameter, the one or more processors are to:
decrypt the fourth parameter to obtain a decrypted random number,
determine that the fourth parameter matches the second parameter, and
authenticate the user device based on determining that the fourth parameter matches the second parameter.
9. The system of claim 7, where the one or more processors are further to:
embed a security version number in the certificate before sending the certificate to the user device.
10. The system of claim 7, where the one or more processors are further to:
encrypt the certificate based on the key before sending the certificate to the user device.
11. The system of claim 7, where, when sending the certificate to the user device, the one or more processors are to:
send the certificate to the user device by using a secure transfer protocol.
12. A non-transitory computer-readable medium storing instructions, the instructions comprising:
one or more instructions that, when executed by at least one processor of a device, cause the at least one processor to:
receive an application from a first server;
receive an instruction to open the application;
request, after receiving the instruction to open the application and from a second server, a certificate for the application;
receive, from the second server, the certificate based on requesting the certificate,
the certificate being an encrypted certificate; and
decrypt the certificate based on a key associated with the application.
13. The non-transitory computer-readable medium of claim 12, where the one or more instructions to request the certificate for the application comprise:
one or more instructions that, when executed by the at least one processor, cause the at least one processor to:
determine, after receiving the instruction to open the application, that the device does not store the certificate, and
request the certificate for the application based on determining that the device does not store the certificate.
14. The non-transitory computer-readable medium of claim 12, where the instructions further comprise:
one or more instructions that, when executed by the at least one processor, cause the at least one processor to:
store the certificate in a secure storage after decrypting the certificate.
15. The non-transitory computer-readable medium of claim 12, where the instructions further comprise:
one or more instructions that, when executed by the at least one processor, cause the at least one processor to:
request, from the second server, credentials by using the certificate,
the credentials including information to authenticate the device to access a third server, and
receive the credentials from the second server.
16. The non-transitory computer-readable medium of claim 15, where the instructions further comprise:
one or more instructions that, when executed by the at least one processor, cause the at least one processor to:
requesting a session with the third server using the credentials.
17. The non-transitory computer-readable medium of claim 12, where the instructions further comprise:
one or more instructions that, when executed by the at least one processor, cause the at least one processor to:
determine that the certificate is not up-to-date based on a security version number of the certificate; and request, from the second server, another certificate for the application based on determining that the certificate is not up-to-date.

18. A non-transitory computer-readable medium storing instructions, the instructions comprising:
one or more instructions that, when executed by at least one processor of a device, cause the at least one processor to:
receive a request for a certificate from a user device,
the request including a first parameter, a second parameter, and a third parameter, and
the first parameter including an application identifier of an application;
identify a key based on the application identifier;
generate a fourth parameter based on the key and the third parameter;
authenticate the user device based on the fourth parameter and the second parameter;
generate the certificate based on authenticating the user device;
store information associated with the certificate; and
send the certificate to the user device,
the user device using the certificate to establish a session to interact with an application server.

19. The non-transitory computer-readable medium of claim 18,
where the third parameter includes an encrypted random number, and
where the one or more instructions to generate the fourth parameter comprise:
one or more instructions that, when executed by the at least one processor, cause the at least one processor to:
decrypt, based on the key, the encrypted random number to obtain the fourth parameter.

20. The non-transitory computer-readable medium of claim 18,
where the second parameter includes a random number, and
where the one or more instructions further comprise:
one or more instructions that, when executed by the at least one processor, cause the at least one processor to:
encrypt, before sending the certificate to the user device, the certificate based on the random number.

\* \* \* \* \*